No. 609,588. Patented Aug. 23, 1898.
E. E. PARKS.
MOTOR FOR FLUE SCRAPERS OR CLEANERS.
(Application filed Sept. 20, 1897.)
(No Model.)

WITNESSES:
Ella P. Wood
Joseph Irwin

INVENTOR
Edwin E. Parks.
By
Moulton & Flanders
Attorneys.

THE NORRIS PETERS CO., PHOTO-LITHO., WASHINGTON, D. C.

UNITED STATES PATENT OFFICE.

EDWIN E. PARKS, OF GRAND RAPIDS, MICHIGAN, ASSIGNOR OF ONE-HALF TO FRANK A. SIMONDS, OF SAME PLACE.

MOTOR FOR FLUE SCRAPERS OR CLEANERS.

SPECIFICATION forming part of Letters Patent No. 609,588, dated August 23, 1898.

Application filed September 20, 1897. Serial No. 652,341. (No model.)

*To all whom it may concern:*

Be it known that I, EDWIN E. PARKS, a citizen of the United States, residing at Grand Rapids, in the county of Kent and State of Michigan, have invented certain new and useful Improvements in Motors for Flue Scrapers or Cleaners; and I do hereby declare the following to be a full, clear, and exact description of the invention, such as will enable others skilled in the art to which it appertains to make and use the same.

My invention relates to improvements in flue scrapers and cleaners, and more especially to such as are operated by a fluid under pressure; and its object is to provide the same with certain new and useful features hereinafter more fully described, and particularly pointed out in the claims, reference being had to the accompanying drawings, in which—

Figure 2:
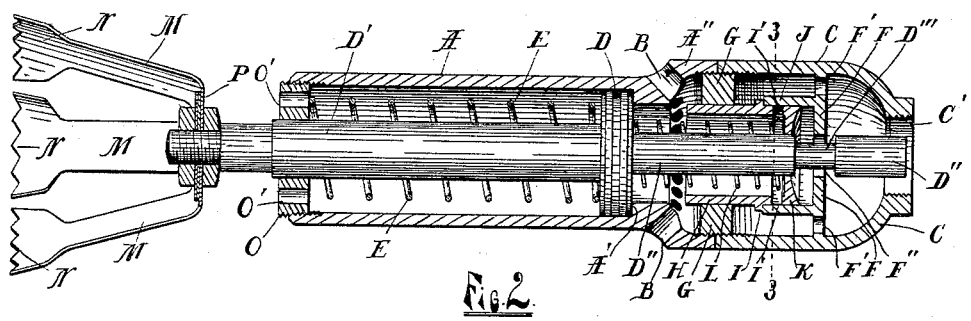
Figure 1:
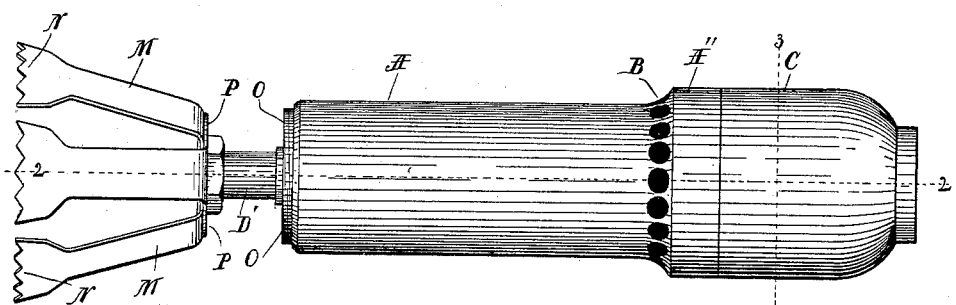
Figure 4:
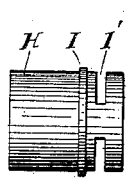
Figure 3:
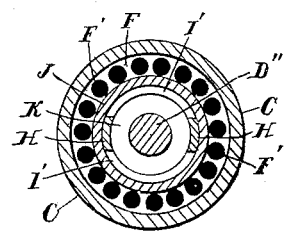

Figure 1 is a side elevation of a device embodying my invention; Fig. 2, a longitudinal section on the line 2 2 of Fig. 1; Fig. 3, a transverse section on the line 3 3 of Figs. 1 and 2, and Fig. 4 a detail of the valve.

Like letters refer to like parts in all of the figures.

A is a suitable cylinder having its bore reduced at the rear, forming a shoulder A' and an enlarged rear end A'', between which are the exhaust-ports B.

C is a valve-chamber detachably secured to said enlarged end and provided with a screw-threaded opening C' to attach a pipe or hose to convey water or other liquid or fluid under pressure to the device to operate the same.

D is a piston movable in the cylinder A, yieldingly pressed against the shoulder A' by a spring E, and provided with a rod D', extending through a cylinder-head O, having openings O' for the escape of any water that may pass the piston. Said rod is freely movable longitudinally in the head O and has attached at its outer end a flue-scraper consisting of a disk P, having flexible forwardly and outwardly inclined arms M integral therewith and provided at their forward ends with segmental toothed ends N. To this scraper is imparted a longitudinal reciprocating motion by the action of the water admitted through the openings C', as hereinafter described. The piston-rod is prolonged rearward through the valve-chamber, as at D'', and provided with a reduced portion D'''.

F is a transverse diaphragm near the rear of the valve-chamber C and provided with a central opening F'' to permit the passage of the rod D'' and also a series of openings F' near the wall of the valve-chamber to permit the water to surround the valve. Concentric with the opening F'' and attached to the forward side of the diaphragm is a short cylinder J, open at the forward end, and within which cylinder is a longitudinally-movable cylindrical valve H, open at the forward end, having a circumferential flange I to engage the end of the cylinder J, lateral ports I', and a head K, having a central opening, through which opening passes the rod D''. A spring L engages the piston D and the head K and yieldingly presses the valve H backward within the cylinder J until stopped by the flange I.

G is a transverse diaphragm at the forward end of the valve-chamber, threaded circumferentially to connect the cylinder and valve-chamber and having a central opening in which the valve H is longitudinally movable. Said central opening and the reduced bore of the cylinder are each substantially the same as the external diameter of the valve H, and the reduced part D''' of the rod D'' is so located that it is within the opening F'' while the piston D is against the shoulder A'. The water will then flow through said opening, and pressing against the head K overcome the spring L and move the valve H forward. This closes the exhaust-ports B and opens the ports I'. The water now flows through the openings F' and said ports and presses against the piston D, overcoming the spring E and making a forward stroke of the scraper. This forward movement brings the reduced portion D''' forward within the opening in the head K and the rear end of the rod D'' within the opening F''. This cuts off the flow of water against the rear of the head K by closing the opening F''' and releases the pressure on said head by permitting the water to escape through the opening in the same. The valve H is now moved back to its former position by the spring L, which cuts off the flow of water through the ports I' and opens the exhaust-ports B. The spring E now forces the piston D, together with parts attached, back to its original position, which again reopens the opening F'', and the device automatically repeats the described operation, the result being a rapid reciprocating motion of the tool on the end of the rod D'.

It is obvious that it is immaterial as to what tool is attached to the rod D' or for what particular purpose the reciprocating piston is utilized. I therefore do not limit myself to the particular use described; but

What I claim, and wish to secure by Letters Patent, is—

1. In combination with a reciprocating piston, a valve-chamber, a diaphragm in said chamber having an opening, a cylinder attached to said diaphragm, a valve moving in said cylinder and having a head having an opening in line with the opening in the diaphragm, and a rod moving in said opening and having a reduced portion, substantially as described.

2. In combination with a reciprocating piston, a valve-chamber, a fixed diaphragm in the same having a central opening, a cylinder concentric with said opening, a valve movable in said cylinder, having a head having a central opening, inlet and exhaust ports controlled by said valve, and a rod in said openings having a reduced portion and attached to the reciprocating piston, substantially as described.

3. In combination with a reciprocating piston, a valve-chamber, and exhaust-ports; a longitudinally-movable cylindrical valve having lateral ports and a head having a central opening; a diaphragm in the valve-chamber having a central opening and openings near the walls of the valve-chamber, a cylinder attached to said diaphragm and surrounding said valve, and a rod attached to said piston and having a reduced portion, said rod also passing through the openings in said valve and diaphragm, substantially as described.

4. In combination with a reciprocating piston, a spring and a valve-chamber at the respective sides of the same, exhaust-ports and inlet-ports in the valve-chamber, a diaphragm in said chamber having a central opening and marginal openings, a cylinder on said diaphragm between the central and marginal openings, a cylindrical valve having a flange engaging the end of said cylinder, and lateral ports closed by said cylinder, and a head having a central opening; a spring engaging said valve, and a rod attached to said piston and having a reduced portion and passing through said openings in the head and diaphragm, substantially as described.

5. In combination with a piston, a cylinder having a reduced bore and enlarged end and ports between the same, a valve-chamber attached to said enlarged end, a diaphragm in said chamber having a central opening and marginal openings and a cylinder between said central and marginal openings, a cylindrical valve having a flange, lateral ports and a head having a central opening, springs to move said piston and valve, a rod having a reduced portion attached to the piston and extending through the opening in the valve and diaphragm, a rod extending from the piston through a perforated head in the forward end of the cylinder, and a scraping-tool attached to said rod, substantially as described.

6. The combination of a cylinder having a reciprocating piston extending from one end thereof, and lateral exhaust-ports, a valve-chamber at the other end of said cylinder having an end opening adapted to attach said chamber to a pipe, a valve in said chamber to admit fluid to one side of the piston and to exhaust said fluid, valve mechanism to admit fluid to said valve to move the same in one direction, and springs to move the piston and valve in the direction opposite to the fluid-pressure, substantially as described.

7. The combination of a reciprocating flue-scraper, a cylinder having a reduced bore and exhaust-ports at one end and a perforated head at the other end, a piston in said cylinder, a rod extending from said piston through said perforated head, said flue-scraper attached to said rod, a spring engaging said piston, a valve-chamber at the rear of said cylinder, a rod in the axis of said chamber and attached to said piston and having a reduced portion, a cylindrical valve surrounding said rod, having a spring, a flange, lateral ports, and a head having a central opening, a cylinder surrounding said valve, a diaphragm to which said cylinder is attached, a central opening and marginal openings in said diaphragm, substantially as described.

In testimony whereof I affix my signature in presence of two witnesses.

EDWIN E. PARKS.

Witnesses:
LUTHER V. MOULTON,
FRANK A. SIMONDS.